United States Patent Office

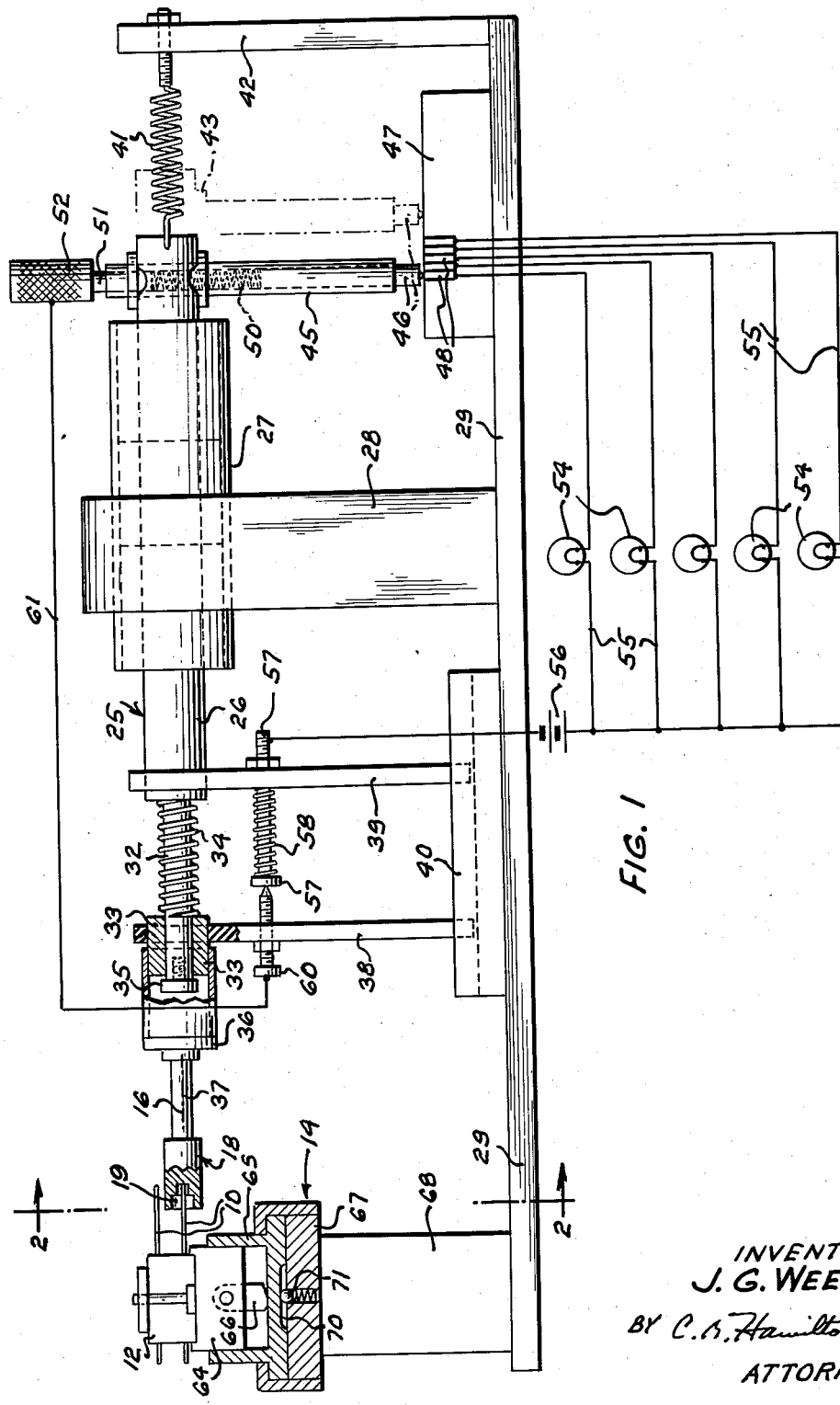

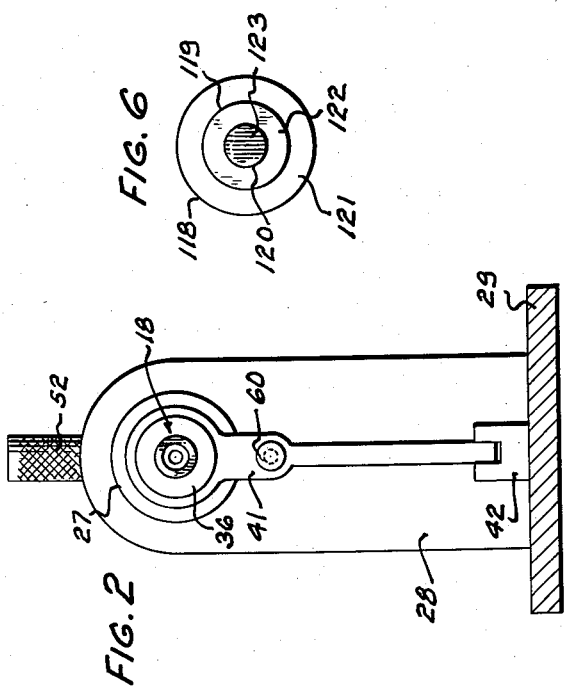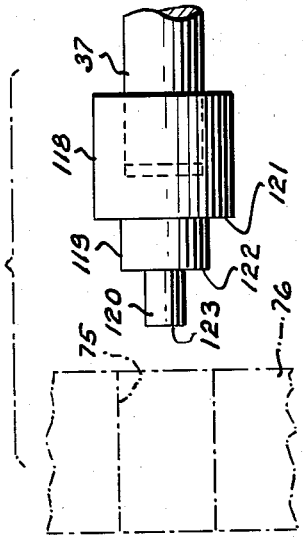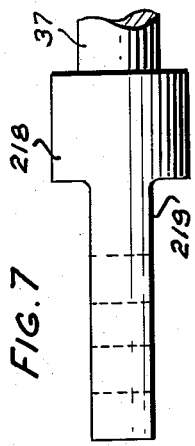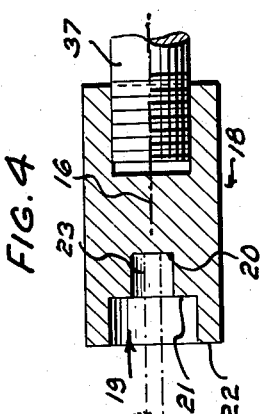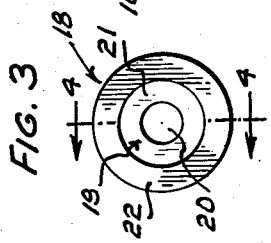

2,972,815
Patented Feb. 28, 1961

2,972,815

DEVICE FOR CHECKING AND INDICATING THE POSITION OF PORTIONS OF AN ARTICLE

John G. Weeks, Downers Grove, Ill., assignor to Western Electric Company, Incorporated, New York, N.Y., a corporation of New York Filed Feb. 8, 1957, Ser. No. 639,149

2 Claims. (Cl. 33—174)

This invention relates to a device for checking and indicating the position of portions of an article and more particularly to an indicating device for checking the position of terminals on an electrical component.

An object of the invention is to provide an improved device for checking and indicating the position of portions of an article.

Another object of the invention is to provide a device for checking and indicating the position of the ends of terminals on an electrical component.

A further object of the device is to provide a device for checking and indicating the position of apertures or recesses in an article.

A device illustrating certain features of the invention may include a holder for supporting an electrical component in a predetermined position relative to a predetermined axis and with the terminal to be checked in close proximity to said axis. A gage is mounted for movement along said axis into engagement with the terminal and has a stepped portion forming a plurality of gaging surfaces disposed perpendicular to the axis and in axially spaced relation to each other with one of them centrally disposed and the others spaced predetermined different distances from the axis for engaging the end of the terminal, whereby if the terminal is properly positioned the gage moves to a predetermined longitudinal position and the terminal engages the central gaging surface, but if the end of the terminal is laterally out of position beyond an allowable tolerance, it engages another one of the gaging surfaces and limits the longitudinal movement of the gage to a different longitudinal gaging position. Individual signal lamps are provided for each predetermined longitudinal gaging position of the gage, and switch means actuated in response to movement of the gage serves to actuate the signals to indicate the longitudinal gaging position of the gage and also the lateral position of the terminal relative to the axis.

In another embodiment of the invention the gage of the device may be provided with external stepped gaging surfaces arranged to be moved into a recess in an article to check its location on the article.

Other objects and advantages of the invention will become apparent by reference to the following detailed description and the accompanying drawings illustrating a preferred embodiment thereof, in which Fig. 1 is an elevational view of the device used for checking and indicating the position of terminals on an electrical component and showing the device in operative position;

Fig. 2 is a vertical transverse sectional view of the device taken on line 2—2 of Fig. 1;

Fig. 3 is an enlarged end view of the gage shown in Fig. 1;

Fig. 4 is a longitudinal sectional view of the gage taken on line 4—4 of Fig. 3;

Fig. 5 is a fragmentary side elevational view of a modified embodiment of a gage for checking the position of recesses in an article and showing a portion of the article in dotted lines;

Fig. 6 is an end view of the gage shown in Fig. 5; and

Figs. 7 and 8 are plan and side elevational views, respectively, of another embodiment of the gage.

The embodiment of the device shown in Figs. 1–4 is designed to check the position of the ends of wire terminals 10 of a relay component 12 which is supported in a holder 14 in a predetermined position with respect to a horizontal axis 16 along which a probe or gage 18 is movable into engagement with the terminal. The gage 18 has a cylindrical stepped recess at one end thereof forming a plurality of annular gaging surfaces 20, 21, 22 disposed in a predetermined axially spaced relation to one another and disposed coaxial with the axis 16 in different positions laterally thereof as shown in Figs. 3 and 4. The diameter of the gaging surface 20 in the portion 23 of the recess 19 is of a predetermined size to receive the end of a terminal 10 which is accurately positioned within allowable limits. If the terminal 10 is offset beyond the allowable limit it will engage either the annular surface 21 or 22.

The gage 18 is mounted on a carrier 25 for axial movement therewith and for a limited axial movement relative thereto. The carrier is in the form of a rod 26 mounted slidably in a bearing 27 of a supporting standard 28 which is mounted on a base 29. The forward end 32 of the rod 26 is reduced and supports slidably thereon a bushing 33 which is stressed by a spring 34 to the left as viewed in Fig. 1 against the head of a retaining screw 35 threaded on the rod 26. The bushing 33 is secured in one end of a cylindrical shell 36 from one end of which extends a rod 37 for supporting the gage 18 on the threaded forward end thereof. Depending arms 38, 39 of dielectric material on the rod 26 and the bushing 32, respectively, have their lower ends engaging slidably in a groove in a guide member 40 mounted on the base 29 for holding the shell and the rod against rotation while permitting axial movement thereof. A spring 41 connected at one end to the carrier 25 and at its other end to a post 42 on the base 29 serves to move and maintain the carrier in a normal retracted position indicated by dotted lines 43.

From the description thus far, it will be seen that with a relay component 12 mounted on the holder 14 and with a selected terminal 10 in checking position, the operator may engage the carrier and move it toward the holder to advance the gage 18 into engagement with the terminal 10. If the terminal 10 is properly positioned within the allowable limits the end thereof will engage the gaging surface 20 and the gage 18 and the carrier will be advanced longitudinally to a predetermined gaging position. If the end of the terminal 10 is out of position within certain limits it will be contacted by the gaging surface 21, and the gage 18 and the carrier 28 will be moved longitudinally to a second gaging position, whereas if the terminal 10 is bent out of alignment so that it will be contacted by the gaging surface 22, the gage 18 and the carrier 25 will be moved longitudinally to a third gaging position.

Means are provided for indicating the several longitudinal gaging positions of the gage 18 and which of the gaging surfaces thereof is being contacted by the terminal, and the alignment or degree of misalignment of the terminal 10. For this purpose a dielectric tube 45 is mounted on the rod 26 for supporting a brush 46 therein, the lower reduced end of which is adapted to slide on the upper surface of a dielectric block 47 and engage commutator segments 48 embedded therein in insulated relation to each other. The brush 46 is urged into engagement with the block 47 by a spring 50 disposed within the tube 45 and held therein by a screw plug 51, the enlarged upper end 52 of which forms a handle by means of which the carrier may be moved from a normal retracted or inoperative position into operative position in engagement with the terminal to be checked. The commutator segments 48 are individually connected to indicating devices in the form of signal lamps 54 by conductors 55 which also connect the lamps to a battery 56 and to a contact 57 yieldably mounted on the arm 39 of the carrier 25 and maintained in a normal position thereon by a spring 58. The contact 57 is engageable with a contact 60 on the arm 38 and the contact 60 is connected by a conductor 61 to the screw plug 51.

When the carrier 25 is in its normal retracted or inoperative position the sleeve 33 thereof is held against the enlarged head of the screw 35 on the rod 26 by the spring 34, and the contacts 58 and 60 on the arms 40 and 41 are separated by a relatively small distance so that the circuit to the indicating devices 54 is normally open. In the operation of checking the position of the terminals 10, the carrier 25 is moved toward the holder 14 until the gage 18 conctacts the end of the terminal during which movement the brush 46 rides on the block 47 and the commutator segments and comes to rest on a segment corresponding to the longitudinal gaging position of the gage 18 and a slight additional movement causes the rod 26 of the carrier to move relative to the gage 18 and cause the contact 58 to engage the contact 60 and close the circuit from the battery through the contacts 57–60, the screw plug 51, the spring 50, the brush 46, a commutator segment 48, and the signal lamp 54 connected thereto. The signal lamps 54 will be colored or positioned or have indicia thereon to indicate the different longitudinal gaging positions of the gage 18 and the different gaging surfaces 20, 21, and 22 contacted by the terminals and thereby indicate the alignment or extent of misalignment of the terminal being checked.

To provide for the positioning of the various rows of terminals 10 and the individual terminals in the rows into checking position on the device, the holder 14 is provided with means for adjusting the position of the relay component 12 on the device. As shown herein the component 12 is clamped to a seat in the form of a block 64 which is adjustable vertically in a slide 65 by a manually operated cam 66, and the slide 65 is supported slidably on a guide 67 which is mounted on a supporting bracket 68 on the base 29. The slide 65 is provided with a row of transverse grooves 70 disposed in predetermined spaced relation to each other corresponding to the horizontal spacing of the terminals 10 to be tested and which cooperate with a spring pressed detent 71 in the guide 67 for positioning the holder 14 and the relay component 12 in the various selected checking positions.

In Figs. 5 and 6 is shown another embodiment of the gage for gaging the position of a recess or aperture 75 in an article 76. The gage 118 is cylindrical in form and has a stepped outer cylindrical contour forming reduced cylindrical portions 119 and 120 and annular gaging surfaces 121, 122, and 123 which are disposed transversely of the axis and in predetermined spaced relation to each other corresponding to the spacing of the gaging surfaces 20, 21, and 22 of the gage 18. The gage 118 is adapted to be substituted for the gage 18 and supported on the rod 37. The gage 118 is proportioned so that the portion 119 thereof is slightly smaller than the diameter of the aperture 75, and when the aperture 75 is properly positioned within allowable limits relative to an article 76 on the holder 14, the portion 119 of the gage will enter the aperture and the gaging surface 121 will engage the article 76 and cause the gage 118 to be positioned longitudinally in a predetermined gaging position. If the aperture 75 is slightly out of alignment within predetermined limits the portion 120 of the gage 118 will enter the aperture 75 and the gaging surface 122 will contact the article 76 and cause the gage 118 to be positioned longitudinally in a second gaging position; whereas, if the aperture 75 is positioned still farther out of alignment, the gaging surface 123 will engage the article 76 and cause the gage 118 to be positioned longitudinally in a third gaging position. Each of these various gaging positions will be indicated by the corresponding indicating means 54 of the device.

The embodiment of the gage 218 shown in Figs. 7 and 8 has a flat portion 219 provided with a centrally slotted and stepped contour forming an upper arm 220 and a lower arm 221. The central portion of the slot is of a predetermined width and provides a gaging surface 222 for contacting the end of a terminal 10 which is properly positioned within allowable limits. Transverse gaging surfaces 223 and 224 formed on the arm 221 in predetermined axially spaced relation to each other and the gaging surface 222 corresponding to the arrangement of gaging surfaces 20, 21, and 22 of gage 18 and in dfferent laterally spaced relation to the axis 16 for indicating the alignment or lateral misalignment of the terminal in one direction relative to the axis 16. Transverse gaging surfaces 227 and 228 are formed on the arm 222 in axially spaced relation to the other transverse gaging surfaces 222, 223, and 224 as shown in Fig. 8 and in laterally offset relation to the axis 18 to indicate the degree of lateral misalignment of the terminal 10 in the opposite direction. With the gage 218 on the carrier 25 the five gaging surfaces 222, 223, 224, 227, and 228 serve to stop the gage 218 longitudinally in five different gaging positions. The signal lamps 54 associated therewith indicate these five positions and the alignment or the degree and direction of misalignment of the terminal.

Although the holder 14 for supporting the article being checked is shown as being stationary and the gage 18 as being movable into engagement with the article, it is manifest that the gage may be stationary and the holder 14 and the article therein may be movable and that the operation of indicating devices 54 would be controlled by the movement of the holder toward the gage.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A device for checking the position of a terminal on an electrical component which comprises a base, a holder on said base for holding the component in a predetermined position with the terminal extending therefrom, a carrier, means mounting said carrier on said base for movement along a predetermined axis toward said holder, a gage mounted on said carrier for movement therewith along said axis into engagement with the terminal of the component on said holder and for limited axial movement relative to said carrier, resilient means for yieldably maintaining said gage in a normal position on said carrier, said gage having a plurality of gaging surfaces engageable with the terminal and disposed in axially spaced relation to one another and in different positions laterally of the axis, means for actuating said carrier toward said holder to move the gage into contact with said terminal and to effect relative movement between said gage and said carrier, a plurality of signal circuits, commutator means responsive to the movement of the carrier for selecting the signal circuit corresponding to the gaging position of the gage, and means operable in response to said relative movement between the carrier and the gage when the latter is in contact with said terminal for actuating the selected signal circuit.

2. In an apparatus for determining the alignment or extent of lateral misalignment of the free ends relative to the fixed ends of terminals projecting from one side of an electrical component, a holder for said electrical component, a gage, a member for yieldably supporting the gage, mounting means for supporting the holder for movement along a predetermined path and for supporting the gage supporting member for movement along an axis perpendicular to said path toward and from said holder, means for locating the holder at various predetermined positions along said path to align successively the fixed ends of the terminals with said axis and said gage, said gage having a plurality of flat circular gaging surfaces disposed perpendicular to and concentric with said axis and in fixed and spaced relation to each other in an axial direction and at predetermined different distances relative to the axis, one of said gaging surfaces being positioned in alignment with said axis and successive gaging surfaces being positioned progressively further from said axis and closer to said holder, means for moving the gage supporting member along said axis to advance the gage into engagement with the free end of the terminal in its path and to effect movement of said supporting member relative to said gage, and means responsive to movement of said gage supporting member relative to the gage for indicating the axial positions of the gage and which of the gaging surfaces is being engaged by the terminal to determine the alignment or extent of misalignment of the free ends of the terminals as they are engaged by the gage.

References Cited in the file of this patent

UNITED STATES PATENTS

| | | |
|---|---|---|
| 992,926 | Updegraff | May 23, 1911 |
| 1,516,124 | Schlaupitz | Nov. 18, 1924 |
| 1,655,905 | Kempton | Jan. 10, 1928 |
| 1,682,464 | Arelt | Aug. 28, 1928 |
| 2,492,369 | Robins | Dec. 27, 1949 |
| 2,553,129 | Burnett | May 15, 1951 |
| 2,569,433 | Highberg | Sept. 25, 1951 |
| 2,781,585 | Stalhandske | Feb. 19, 1957 |
| 2,789,693 | Harder | Apr. 23, 1957 |
| 2,901,105 | Harder | Aug. 25, 1959 |

FOREIGN PATENTS

| | | |
|---|---|---|
| 712,540 | England | July 28, 1954 |